Oct. 14, 1947.  E. B. ROYLE  2,429,170
TRANSPORT LOADER
Filed April 12, 1943  10 Sheets-Sheet 1

Inventor:
Edwin B. Royle
By Pierce & Scheffler
Attorneys.

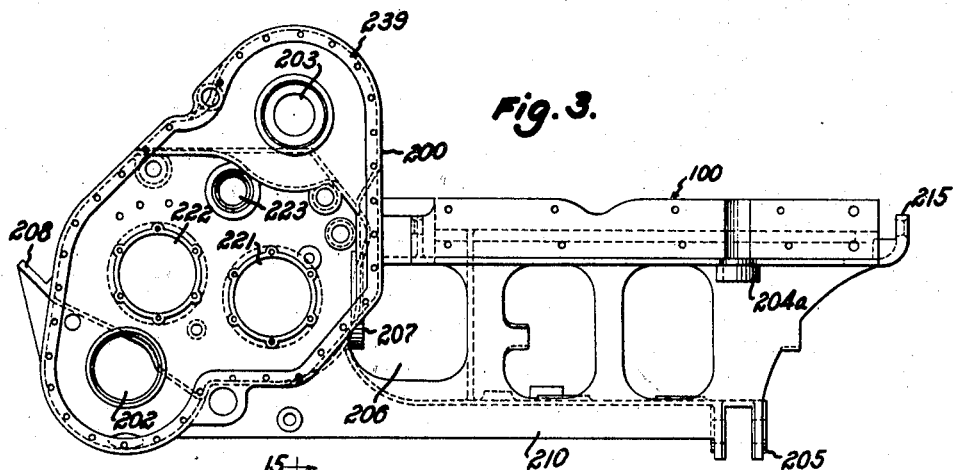
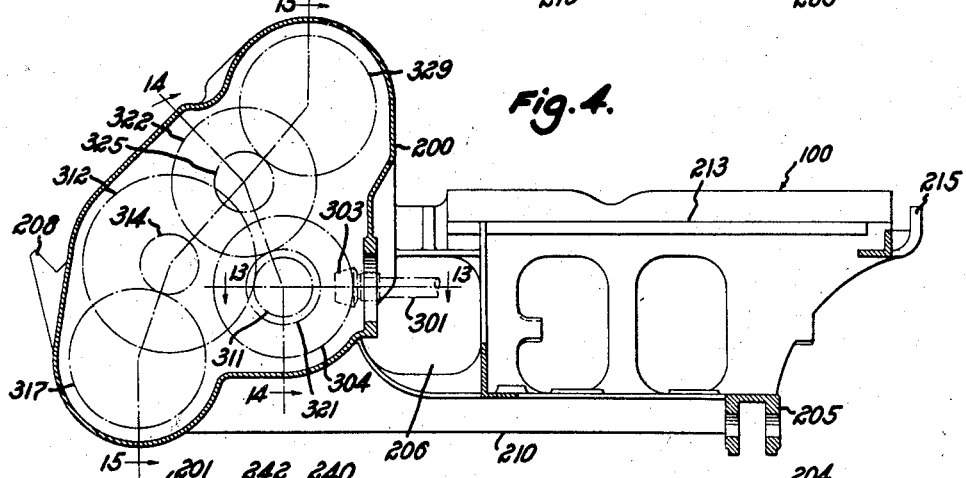
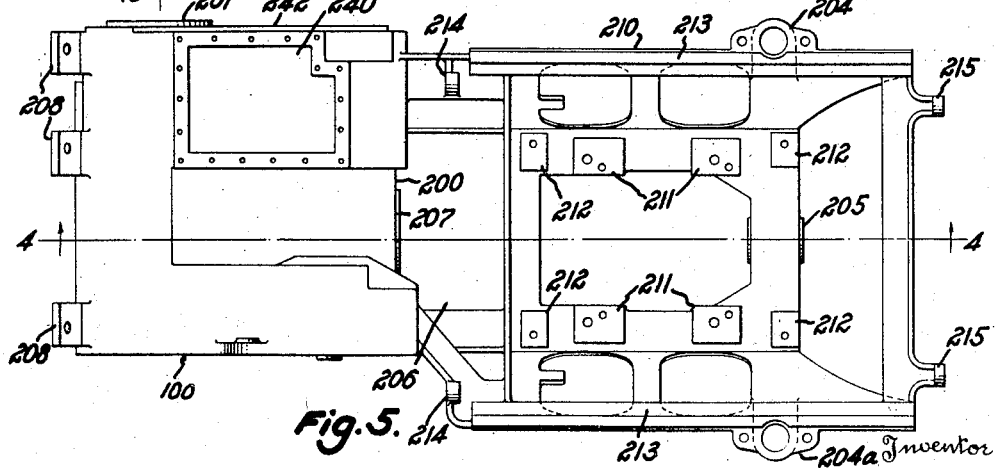

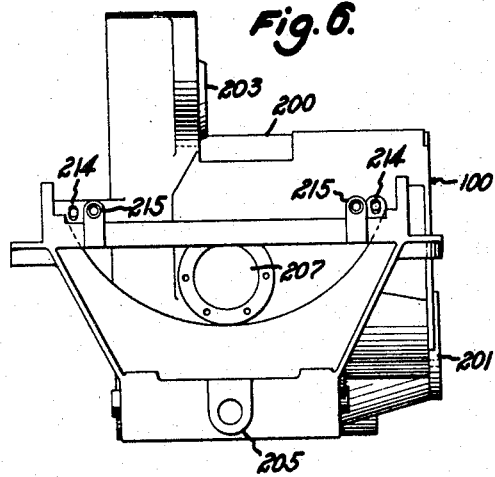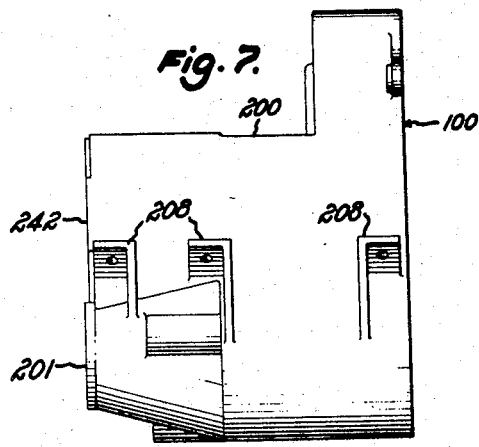

Oct. 14, 1947.    E. B. ROYLE    2,429,170
TRANSPORT LOADER
Filed April 12, 1943    10 Sheets-Sheet 4
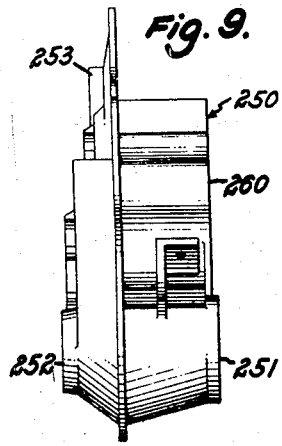
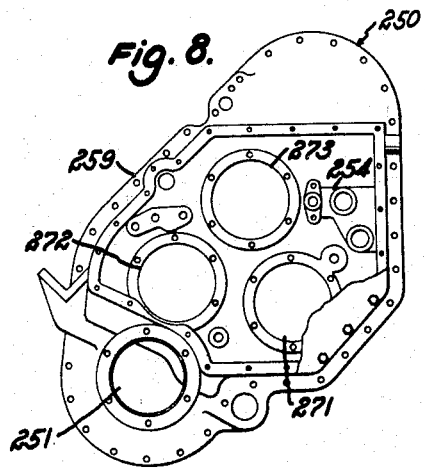
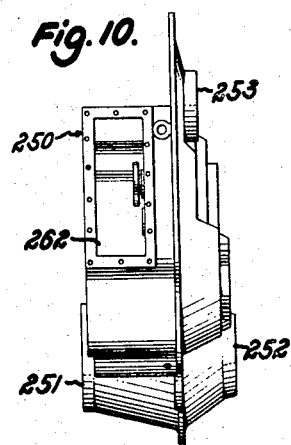
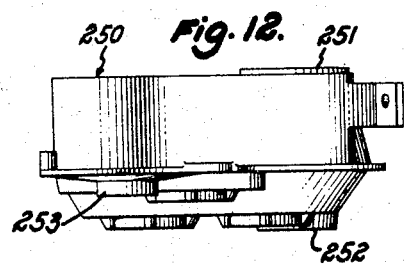
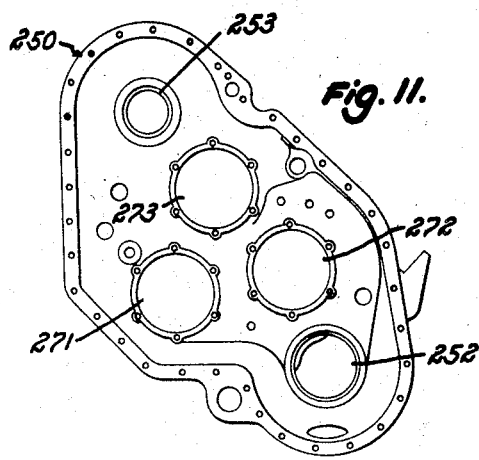
Inventor:
Edwin B. Royle
By Pierce + Scheffler
Attorneys

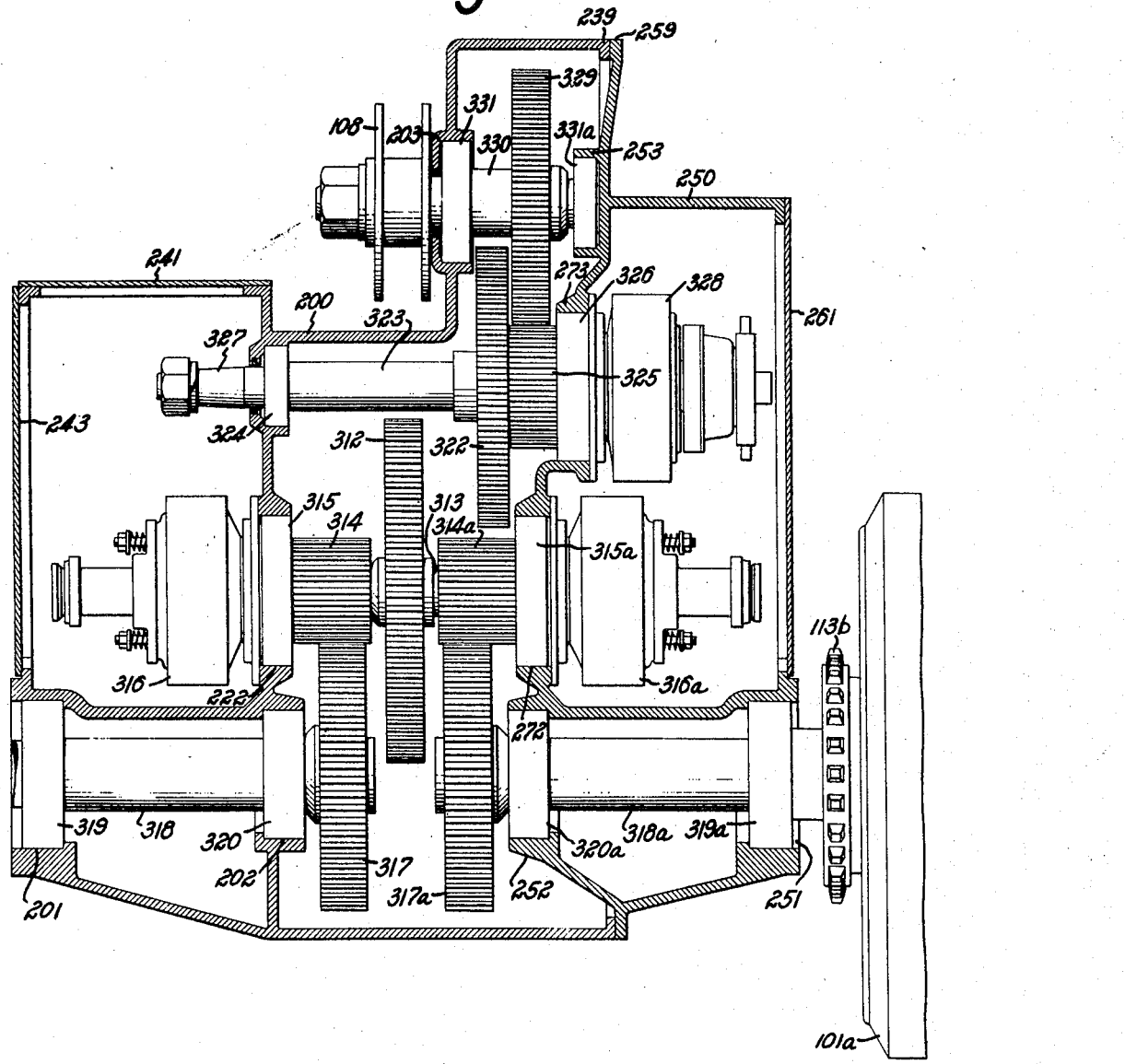

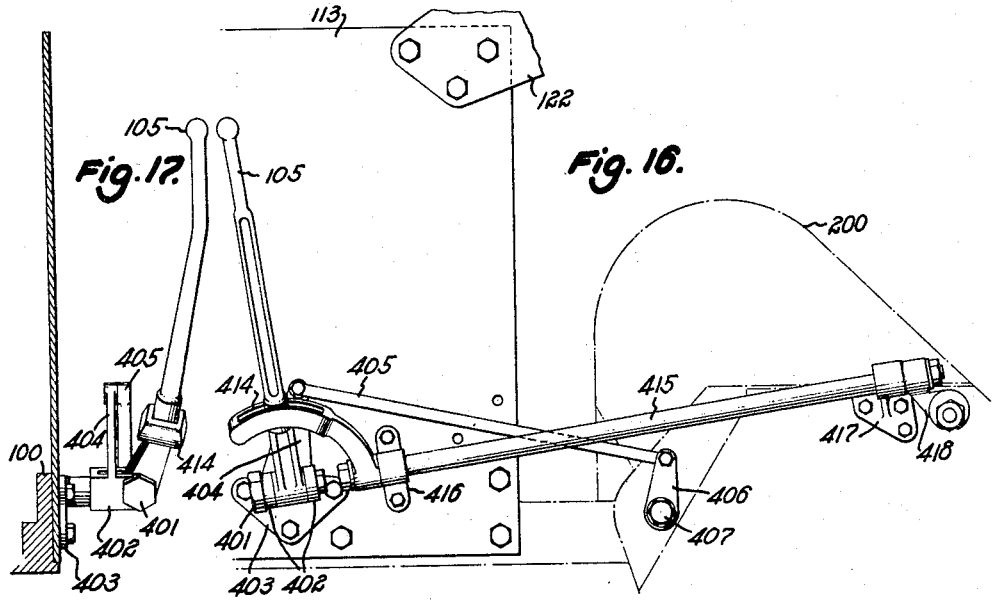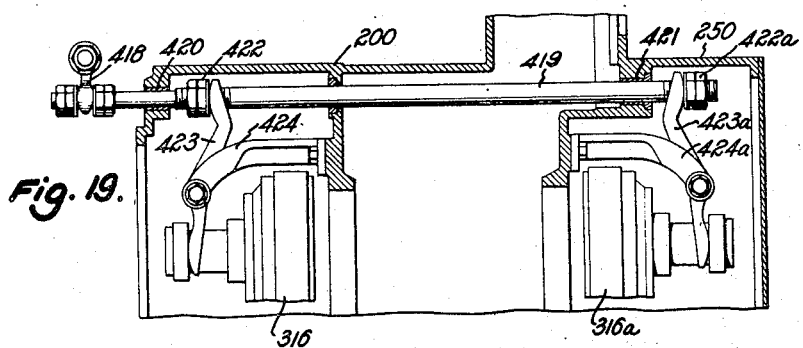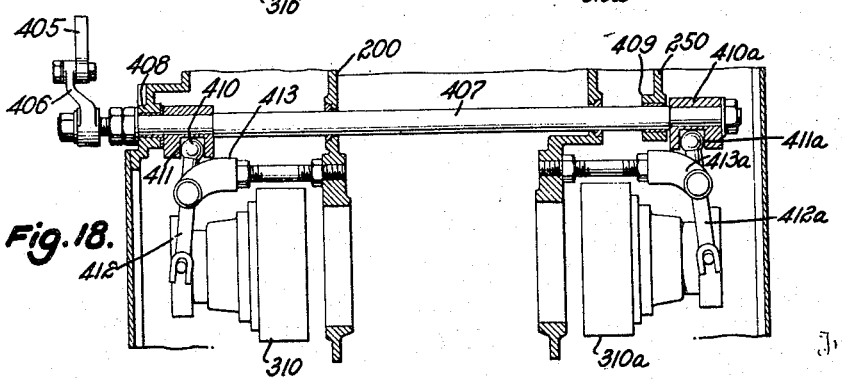

Oct. 14, 1947.     E. B. ROYLE     2,429,170
TRANSPORT LOADER
Filed April 12, 1943     10 Sheets-Sheet 8
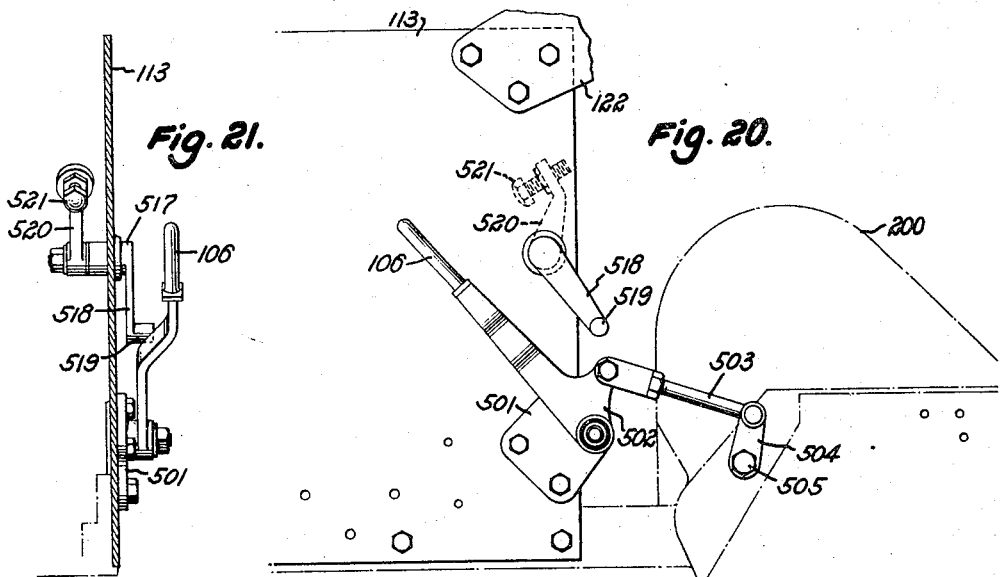
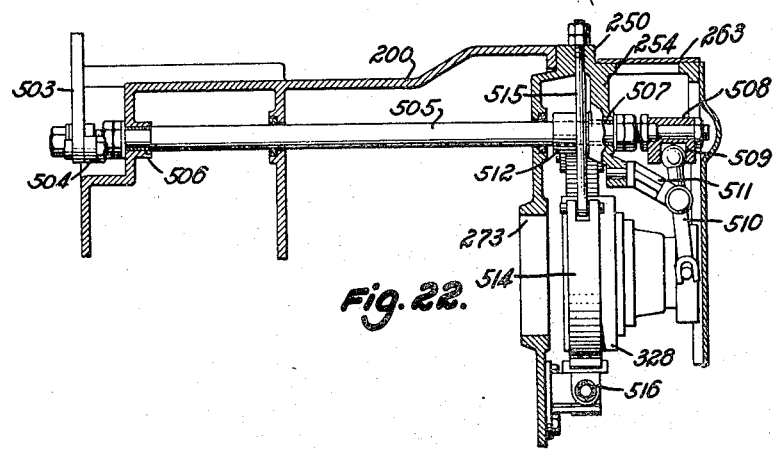
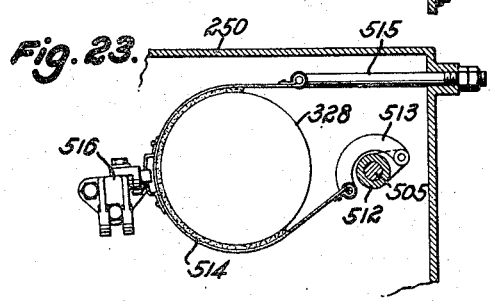
Inventor:
Edwin B. Royle
By Pierce + Scheffler
Attorneys

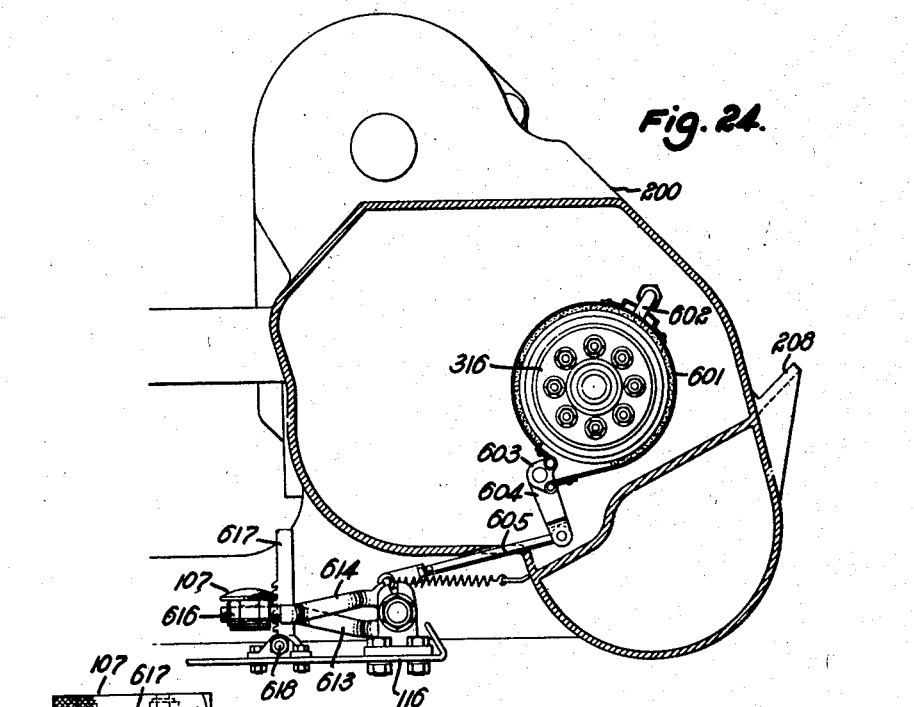
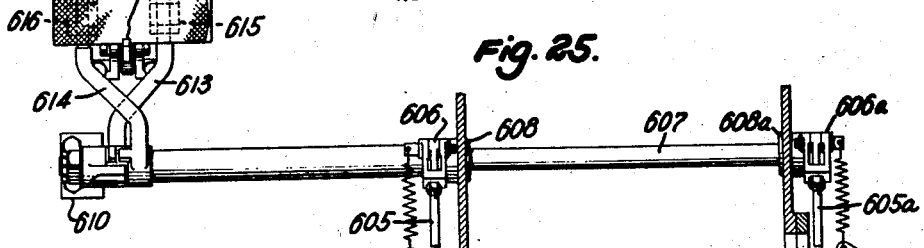
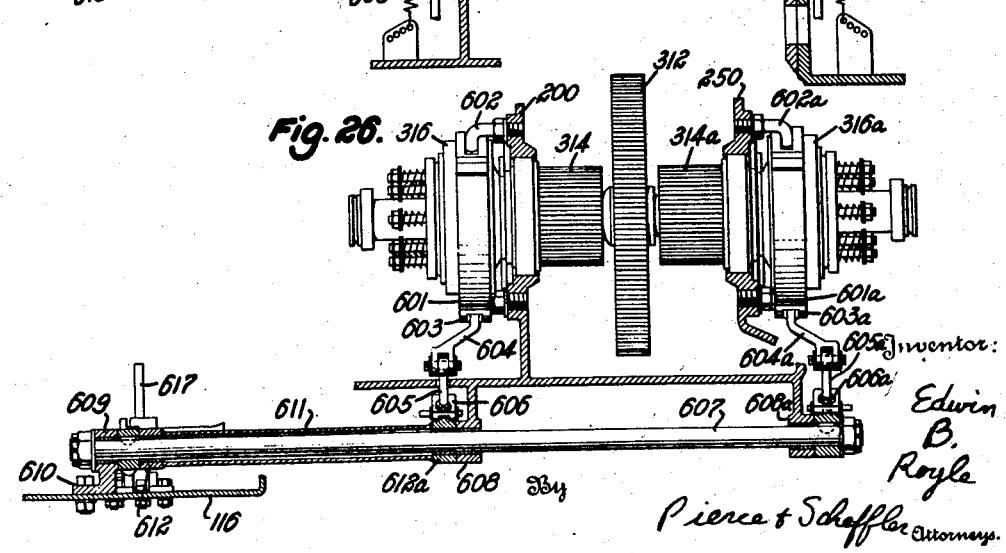

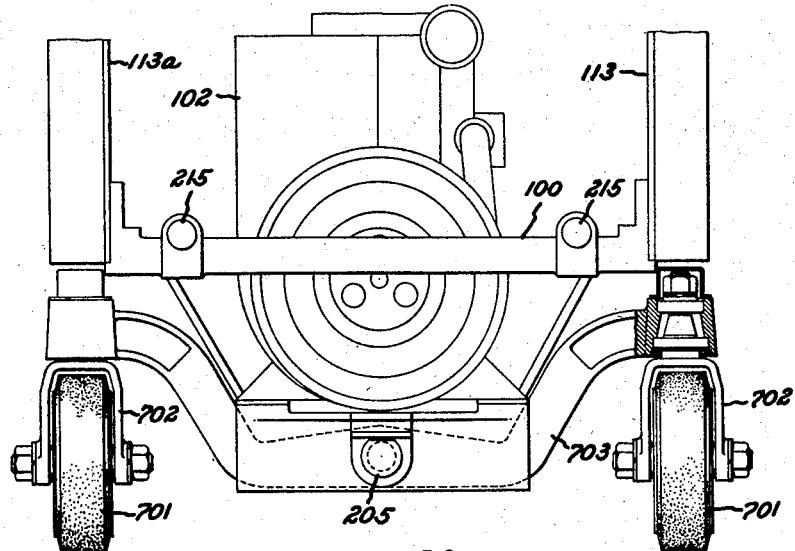
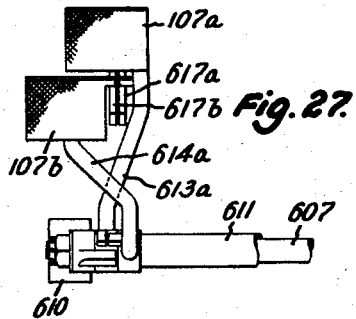
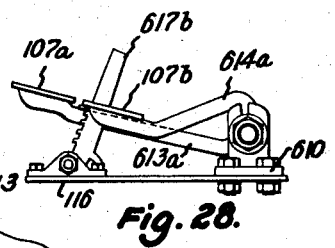
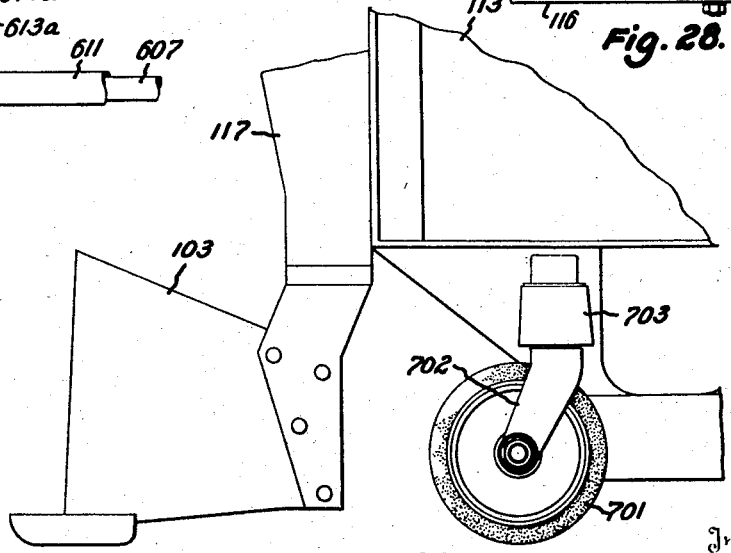

Patented Oct. 14, 1947

2,429,170

UNITED STATES PATENT OFFICE 2,429,170

TRANSPORT LOADER

Edwin B. Royle, Salt Lake City, Utah, assignor to The Eimco Corporation, Salt Lake City, Utah, a corporation of Utah Application April 12, 1943, Serial No. 482,779

28 Claims. (Cl. 214—78)

1

This invention relates to machines for loading and transporting material.

A principal object of the invention is the provision of a compact, mobile material handling device embodying simple one-man control of all the mechanism thereof.

Another object of the invention is the provision of a machine for handling material having power-operated loading mechanism and running gear and a compact gear train connecting the power supply device of the machine with the loading mechanism and running gear.

A further object of the invention is the provision of a compact, mobile unit including a hopper for carrying material, mechanism for loading the hopper and a power supply device for actuating the loading means and the running gear of the unit.

A further object of the invention is the provision of a machine for loading and transporting material including a compartment fully enclosing the gear train for transmitting power to the operating mechanism and running gear of the machine, and separate compartments enclosing clutch mechanism for controlling the transmission of power through the gear train.

Still another object of the invention is the provision of compact and simple control means for power-actuated machines for loading and transporting material.

Other objects and advantages of the invention will appear from the following description of an embodiment of the invention with particular reference to the accompanying drawings.

In the drawings:

Fig. 3 is a side elevation of the main frame of the loader viewed from the left with respect to Fig. 2;

Fig. 4 is a longitudinal sectional elevation of the main frame on line 4—4 of Fig. 5, including a schematic representation of the location of the gear trains of the loader;

Fig. 5 is a plan view of the main frame;

Figs. 6 and 7 are a front elevation and a rear elevation, respectively, of the main frame;

Fig. 8 is an elevation of the gear housing cover viewed from the left with respect to Fig. 2;

Fig. 9 is a rear elevation of the gear housing cover;

Fig. 10 is a front elevation of the gear housing cover;

2

Figure 13:
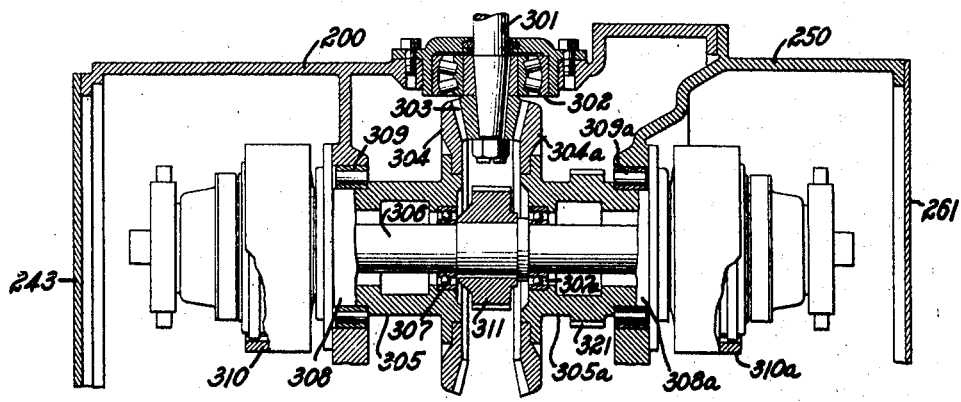
Figure 14:
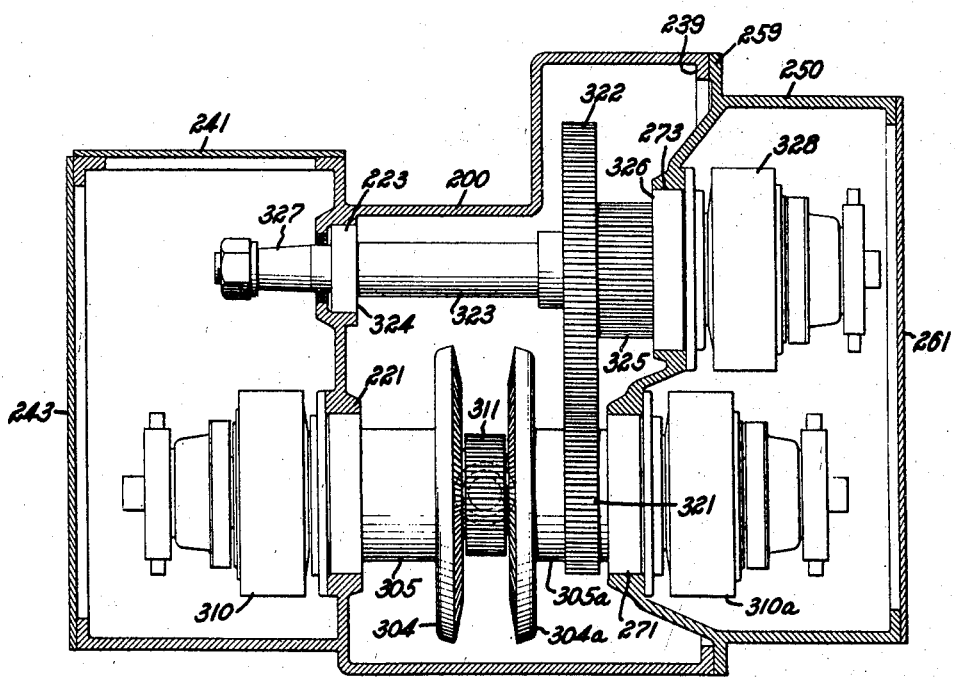

Fig. 11 is an elevation of the gear housing cover showing the opposite side from that illustrated in Fig. 8;

Fig. 12 is a top plan view of the gear housing cover;

Fig. 13 is a section through the transmission gear train on line 13—13 of Fig. 4;

Fig. 14 is a section through the transmission gear train on line 14—14 of Fig. 4;

Fig. 15 is a section through the transmission gear train on line 15—15 of Fig. 4;

Fig. 16 is a fragmentary elevation showing the locomotion and steering control assembly;

Fig. 17 is a fragmentary front view of the control of Fig. 16;

Fig. 18 is a fragmentary section showing a detail of the locomotion control;

Fig. 19 is a fragmentary section showing a detail of the steering control;

Fig. 20 is a fragmentary elevation showing the bucket control assembly;

Fig. 21 is a fragmentary front view of the control of Fig. 20;

Fig. 22 is a fragmentary section showing a detail of the bucket control;

Fig. 23 is a fragmentary section showing a further detail of the bucket control;

Fig. 24 is a fragmentary elevation in partial section showing the brake assembly;

Fig. 25 is a plan view of the brake operating mechanism;

Fig. 26 is an enlarged sectional elevation of the brake assembly and operating mechanism viewed from the right of Fig. 24;

Fig. 27 is a fragmentary plan view in partial section, and Fig. 28 is a fragmentary elevation, of a modified form of brake control means;

Fig. 29 is a fragmentary front elevation of a modified form of transport loader embodying the principles of the invention; and Fig. 30 is a fragmentary side elevation of the transport loader of Fig. 29.

Figure 1:
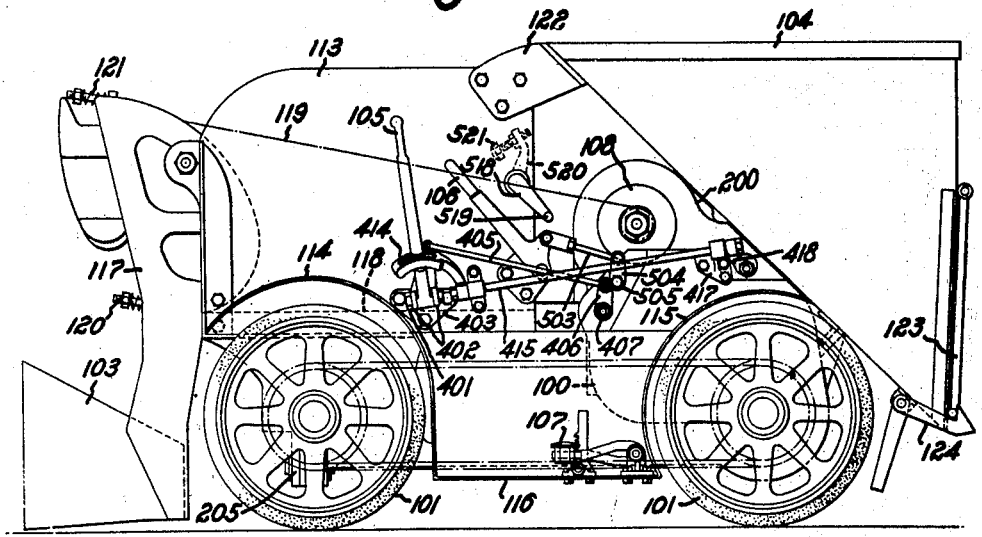
Fig. 1 is a side elevation of a transport loader embodying the principles of the invention.
Figure 2:
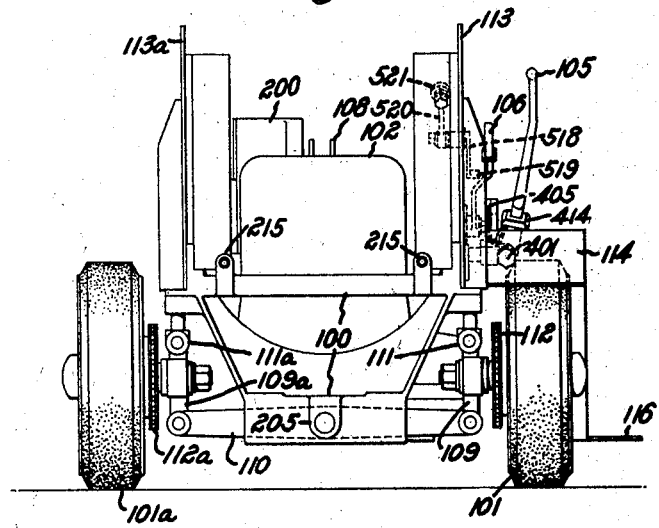
Fig. 2 is a front elevation of the transport loader with the loading bucket removed.

The transport loader embodying the principles of the invention as shown in Figs. 1 and 2 comprises a main frame 100 (shown more particularly in Figs. 3-7) mounted on right- and left-hand pairs of power driven wheels 101 and 101a, respectively, and carrying a motor in engine housing 102. In cooperation with the gear housing cover (shown more particularly in Figs. 8-12), the frame 100 carries a transmission gear train (shown more particularly in Figs. 13-15) adapted to transmit power from the engine for locomotion and for operation of the loading bucket. Mounted on what may be conventionally designated as the "front" end of the machine is a loading bucket 103 and at the rear a transport hopper 104.

Conveniently located on the right-hand side of the machine (with respect to Fig. 2) are a locomotion and steering control assembly (shown more particularly in Figs. 16-19) operated by means of control lever 105, a bucket control assembly (shown more particularly in Figs. 20-23) operated by means of control lever 106, and a brake control assembly (shown more particularly in Figs. 24-26) operated by means of control pedal 107.

Bolted to each side of the main frame are side plates 113, 113a. Side plate 113 carries mud guards 114, 115 and operator's platform 116.

Bucket 103 and its operating members are similar to the corresponding portions of the machine described in Finlay and Royle U. S. Patent No. 1,906,000 and include rocker unit 117 and hoist chain 119 running from the upper end of rocker unit 117 to chain winding reel 108.

Hopper 104 is mounted on brackets 122 attached to side plates 113, 113a and brackets 208 (Figs. 3-7) integral with main frame 100, and is provided with a swinging dump door 123 having a manually releasable latch 124.

The main frame and gear housing cover

The main frame 100, shown particularly in Figs. 3-7, is a one-piece cast steel structure which provides the principal structural element of the machine. It includes the gear housing 200 which cooperates with the gear housing cover 250, shown in Figs. 8-12, to enclose and support the gear train, including the rear wheel drive axles 318, 318a which are mounted in bearings in openings 201, 202 and 251, 252 (Figs. 8-12 and 15), and the driveshaft 330 for bucket chain reel 108 (Figs. 2 and 15), which is mounted in opening 203 and bearing boss 253 (Figs. 10-12 and 15).

The main frame also includes the engine bed frame section 210 which supports the engine and engine housing 102 and mounts the front wheels of the machine.

The front wheels are carried by members 109, 109a (Fig. 2), slidably mounted in guides 204, 204a and pivotally carried at the ends of axle 110, which is pivotally mounted in clevis 205. Stops 111, 111a limit the vertical movement of the front wheels.

The engine is mounted on pads 211, and the engine housing 102 may be bolted to pads 212.

The engine bed frame section also includes members 213 forming rails upon which bucket rocker unit 117 rocks. The rocker unit is prevented from sliding along rails 117 in all positions by means of two pairs of guide cables, one pair connecting lugs 120 on the rocker unit and lugs 214 on the frame and the other pair connecting lugs 121 on the rocker unit and lugs 215 on the frame.

The gear housing section of the main frame includes brackets 208 upon which hopper 104 is mounted.

The transmission gear train

The transmission gear train, shown in Figs. 13-15, comprises two subtrains, the locomotion and steering train and the bucket chain reel driving train, each train including a number of common members serving to connect the trains to the common power supply shaft.

The power shaft 301 (Fig. 13), which may advantageously be coupled with the engine through a fluid drive coupling housed in space 206 (Figs. 3-5) is journalled in bearing 302 mounted in opening 207 in gear housing 200 and carries on its rear end, within the gear housing, bevel pinion 303 which meshes with bevel ring gears 304, 304a carried on sleeves 305, 305a. Sleeves 305, 305a are mounted for free rotation about shaft 306 on bearings 307, 307a at their inner ends and bearings 308, 308a at their outer ends. The sleeves are further journalled in bearings 309, 309a mounted in opening 221 in gear housing 200 and opening 271 in gear housing cover 250, respectively. Sleeve 305 may be coupled with shaft 306 through clutch 310 for forward locomotion, or sleeve 305a may be coupled with shaft 306 through clutch 310a for reverse locomotion.

Keyed to shaft 306 is spur gear 311 which meshes with gear 312 (Fig. 15), keyed to shaft 313. Shaft 313 is journalled within sleeve gears 314, 314a which are journalled in bearings 315, 315a, mounted in opening 222 in gear housing 200 and in opening 272 in gear housing cover 250, respectively. Shaft 313 may be coupled with sleeve gear 314 by means of spring-loaded clutch 316 or with sleeve gear 314a by means of spring-loaded clutch 316a, for steering, or with both sleeve gears for straight locomotion.

Sleeve gears 314, 314a mesh with gears 317, 317a which are keyed to rear wheel drive axles 318, 318a driving the right and left rear wheels, respectively, axle 318 being journalled in bearings 319, 320 mounted in openings 201, 202 in gear housing 200, and axle 318a being journalled in bearings 319a, 320a mounted in openings 251, 252 in gear housing cover 250.

Sleeve 305a (Figs. 13 and 14) includes gear 321 which meshes with gear 322 (Figs. 14 and 15) keyed to power take-off shaft 323. Shaft 323 is journalled in bearing 324 mounted in opening 223 in gear housing 200 and in a bearing (not shown) within sleeve gear 325 which is journalled in bearing 326 in opening 273 in gear housing cover 250. The right-hand end of shaft 323 is provided with power take-off fitting 327. The left-hand end of shaft 323 may be coupled with sleeve gear 325 by means of clutch 328. Sleeve gear 325 meshes with gear 329 keyed to bucket chain reel driveshaft 330 which is journalled in bearing 331 mounted in opening 203 in gear housing 200 and in bearing 331a mounted in boss 253 in gear housing cover 250. The front wheels are driven from the corresponding rear wheels by means of chains 112 and 112a engaging sprockets 113b on each of the wheels.

The entire gear train is supported and enclosed within a central compartment formed between the gear housing section 200 of the main frame, and the gear housing cover 250 which may be bolted together through flanges 239, 259. By providing suitable oil resistant closures, of types well known in the art, between gear casing 200 and the members passing therethrough and between gear casing cover 250 and the members passing therethrough, a fully enclosed, oil-tight gear box is provided. All the clutches are contained within dry compartments provided by the gear casing on the one side of the machine and by the gear casing cover on the other side.

Th clutch compartment provided by the gear casing 200 encloses clutches 310 and 316 and power take-off 327. Top opening 240 is closed by dust-tight closure member 241 and side opening 242 is closed by dust-tight closure member 243. The clutch compartment provided by the gear casing cover 250 encloses clutches 310a, 316a and 328. Side opening 260 is closed by dust-tight closure member 261 and opening 262 is closed by dust-tight closure member 263 (Fig. 22).

Access to the clutches and associated control mechanism is readily obtained by removal of the closures covering openings 240, 242, 260 and 262.

Access to the gear train for adjustment, repair or removal is obtained by removing gear casing cover 250 together with the wheel and clutches associated therewith.

Locomotion and steering control

The locomotion and steering control assembly, shown more particularly in Figs. 16–19, provides complete locomotive and directional control of the machine by manipulation of a single control element, lever 105, mounted on the left side of the machine, as shown in Figs. 1 and 2. The control lever 105 is pivotally mounted on pintle 401 to permit sidewise rocking of the control lever. Pintle 401 is carried in clevis 402 which is rotatably mounted on bracket 403, fastened to the main frame 100 of the machine, to permit longitudinal rocking of control lever 105 about an axis of rotation intersecting the axis of rotation of the sidewise rocking on pintle 401.

Longitudinal movements of the control lever are transmitted by arm 404 forming part of clevis 402, to link member 405 and arm 406 fixedly mounted on rock shaft 407 which passes horizontally through gear casing 200 and into gear casing cover 250 and is mounted for rotation in bearings 408, 409. Cams 410, 410a keyed to rock shaft 407 have cam tracks 411, 411a engaging the ball ends of clutch actuating levers 412, 412a pivoted on bracket arms 413, 413a secured to the gear casing. Rotation of rock shaft 407 by forward motion of control lever 105 brings clutch 310 into engagement for forward locomotion, and rotation of rod 407 by rearward motion of control lever 105 brings clutch 310a into engagement for reverse locomotion. Clutches 310 and 310a are adjusted with reference to the control mechanism so that neither clutch is engaged when control lever 105 is in the neutral position shown in Figs. 16 and 18.

Sidewise movements of the control lever are transmitted by slotted segment 414 to rod 415 mounted for rotation in brackets 416, 417. Rotary motion of rod 415 is transmitted by arm 418 to rod 419 which passes horizontally through gear casing 200 and into gear casing cover 250 and is mounted for reciprocating motion in bearings 420, 421. Members 422, 422a adjustably positioned on rod 419, engage the ends of clutch actuating levers 423, 423a pivoted on bracket arms 424, 424a secured to the gear casing. Movement of rod 419 to the right by corresponding movement of control lever 105 causes disengagement of normally engaged spring-loaded clutch 316, and movement of rod 419 to the left causes disengagement of normally engaged spring-loaded clutch 316a. In the neutral position of control lever 105 shown in Figs. 17 and 19, both clutches 316 and 316a are in engagement.

It will be seen that the described construction permits independent and concurrent engagement and disengagement of the forward and reverse locomotion clutches 310, 310a, and of the steering clutches 316, 316a by simple and natural movements of a single control lever.

Bucket control

The bucket control assembly, shown in Figs. 20–23, provides complete control of the operation of bucket 103 by means of a single control lever 106, pivotally mounted on bracket 501 bolted to side plate 113. Motion of control lever 106 is transmitted by arm 502 to link member 503 and arm 504 fixedly mounted on rock shaft 505 which passes horizontally through gear casing 200 and into gear casing cover 250 and is mounted for rotation in bearings 506, 507. Cam 508 keyed to the end of rock shaft 507 has cam track 509 engaging the ball end of clutch actuating lever 510 pivoted on bracket arm 511 secured to web 254 of the gear casing cover.

Mounted on rock shaft 505 is a lug 512 connected by arcuate link 513 to one end of a brake band 514 encircling the drum of clutch 328. The other end of the brake band is connected to a rod 515 which is adjustably secured to gear casing cover 250. The brake band is supported intermediate the ends by bracket 516 mounted on the inner walls of gear casing cover 250.

Crank lever 517 is pivotally mounted in side plate 113. The outside arm 518 of lever 517 carries an offset lug 519 projecting into the path of control lever 106. The inside arm 520 of lever 517 carries an adjustable stop 521 in the path of bucket rocker arm 117.

In the position of the control lever 106, shown in Figs. 1 and 20, the bucket chain reel clutch 328 and brake band 514 are disengaged. Movement of control lever 106 to the right to contact or approximately contact with lug 519 rocks shaft 505 to cause engagement of clutch 328 to actuate chain reel 108 to elevate bucket 103. When bucket 103 strikes stop 521 at the dump position of the bucket with respect to hopper 104, lever 517 is rocked and lug 519 returns control lever 106 to neutral position. The fall of the bucket may be braked or the bucket may be held in any desired position on its arc of travel by movement of control lever 106 from neutral position to the left rocking shaft 505 to cause engagement of brake band 515 with the drum of clutch 328.

The brake assembly

The brake assembly and operating mechanism, shown in Figs. 24–26, provides means for the control of brakes for steering, stopping and parking the transport loader of the invention by manipulation of a single control pedal 107.

The brakes comprise bands 601, 601a supported about the drums of clutches 316, 316a by brackets 602, 602a mounted on gear casing 200 and gear casing cover 250, respectively. The ends of brake bands 601, 601a are connected to toggles 603, 603a, respectively, mounted on toggle arms 604, 604a connected to link rods 605, 605a.

Link rod 605a is connected to arm 606a keyed to rocker rod 607 which is journalled in bearings 608, 608a mounted in web portions of the main frame, and in bearing 609 mounted on bracket 610 which is fastened to platform 116.

Link rod 605 is connected to arm 606 keyed to rocker sleeve 611 which is mounted concentrically on rod 607 for rotation about rod 607 on bearings 612, 612a.

Brake pedal arms 613, 614 which are keyed to rocker rod 607 and rocker sleeve 611, respectively, project forwardly and have the ends thereof pivotally mounted in parallel bearings 615, 616, respectively, on the underside of pedal 107 adjacent opposite ends. Ratchet bar 617 is pivotally mounted at 618 on platform 116 between arms 613, 614 and may be engaged with the edge of pedal 107 when the latter is depressed.

Rocking the brake pedal to the right (Fig. 25)

rocks the rocker rod 607 and tightens brake band 601a against the drum of clutch 316a thereby braking the wheels on the left-hand side of the machine while rocking the brake pedal to the left rocks rocker sleeve 611 and tightens brake band 601 against the drum of clutch 316 thereby braking the wheels on the right-hand side of the machine. Depressing the brake pedal horizontally actuates both brakes uniformly. The pedal may be locked in depressed position by raising ratchet bar 617 into engagement therewith for parking the machine.

A similar brake control may be provided by the use of paired pedal members 107a, 107b, as shown in Figs. 27 and 28, independently actuating pedal arms 613a, 614a connected to the rocker rod 607 and rocker sleeve 611, respectively, of the brake assembly and lockable in depressed position by engagement with ratchet bars 617a, 617b.

Operation

The entire functioning of the transport loader of the invention is under the complete control of an operator standing on platform 116 with his left hand on locomotion and steering lever 105, his right hand on bucket control lever 106, and his right foot on brake pedal 107.

With the control levers in the neutral position shown in Fig. 1 and the brake pedal fu'ly depressed, clutches 310, 310a are disengaged and spring-loaded clutches 316, 316a are engaged and the running gear is braked through brake bands 601, 601a and clutches 316, 316a.

When the engine is running, power is transmitted through shaft 301, pinion 303, bevel gear 304a, gears 321 and 322 to power take-off shaft 323 at all positions of the control lever 105, so that operation of the bucket through clutch 328 and gears 325 and 329, by manipulation of control lever 106, as hereinbefore described, is possible at all times independently of the locomotion, steering and braking of the running gear.

Upon releasing brake pedal 107, clutch 310 may be actuated by forward movement of lever 105 to transmit power to the wheels through shaft 306, gears 311 and 312, clutches 316, 316a, gears 314, 314a and 317, 317a to shaft 318a for forward locomotion, or clutch 310a may be actuated by rearward movement of lever 105 to transmit power to the wheels through the same gear train for reverse locomotion.

In either forward or reverse position of lever 105, steering may be effected either by releasing clutch 316 or 316a by movement of lever 105 to the left or right, respectively, or by braking the drum of clutch 316 or 316a by rocking pedal 107 to the left or right, respectively, or by both releasing one of said clutches 316, 316a and braking the drum of the released clutch.

In using the transport loader for transferring material from stock piles to a place of use, for example, the bucket is loaded by crowding the bucket in lowered position against the pile of material, the loaded bucket is then raised by manipulation of control lever 106 to dump into hopper 104, these operations are repeated until the desired amount of material has been loaded into the hopper, the machine is then run by manipulation of the locomotion and steering control lever 105 and brake pedal 107 to the place of use, and the load of material is dumped at the place of use by releasing the door of the hopper.

In Figs. 29 and 30 is shown the lower front end of a modified form of transport loader in which the front pair of wheels of the transport loader, shown in Figs. 1 and 2, are replaced by caster wheels. In these figures, identical reference numerals designate corresponding parts in the embodiments of Figs. 1 and 2. The caster wheels 701, which are shown as paired, are journalled in bifurcated stocks 702, the shanks of which are journalled in bearings carried in the ends of axle 703 which is pivotally mounted in clevis 205.

The provision of caster wheels as shown in Figs. 29 and 30 provides very great flexibility in manipulation of the transport loader. It results in a very short turning radius and, in general, provides a running gear having a responsiveness and flexibility commensurate with the rapidity and ease of control provided by the transmission and control assemblies of this invention.

The particular embodiments of the invention shown and described herein are merely illustrative of the principles of the invention and the form and arrangement of the elements of the invention may be widely varied within the scope of the invention as defined by the claims.

This application is a continuation-in-part of my abandoned application Serial No. 426,765, filed January 14, 1942.

I claim:

1. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, and gear means including paired clutch means for selectively connecting for driving in opposite directions said paired trains of gears to said first mentioned train of gears between said power source and the clutch means included in said first mentioned train of gears.

2. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, gear means including paired clutch means for selectively connecting for driving in opposite directions said paired trains of gears to said first mentioned train of gears between said power source and the clutch means included in said first mentioned train of gears, and casing members totally enclosing all of the gear members of said transmission within a single compartment excluding all of the clutch members.

3. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, gear means including paired clutch means for selectively connecting for driving in opposite directions said paired trains of gears to said first mentioned train of gears between said power source and the clutch means included in said first mentioned train of gears, and casing members supporting said transmission and totally enclosing all of the gear members of said transmission within a single compartment excluding all of the clutch members.

4. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, gear means including paired clutch means for selectively connecting for driving in opposite directions said paired trains of gears to said first mentioned train of gears between said power source and the clutch means included in said first mentioned train of gears, casing members supporting said transmission and totally enclosing all of the gear members of said transmission within a single compartment excluding all of the clutch members, and closure members cooperating with said casing members to provide at least one compartment totally enclosing said clutch members.

5. In a mobile material handling machine including laterally disposed running gear, a material container, a material lifting bucket and operating mechanism therefor adapted to transfer material from a source thereof to said container, and a power source, a transmission mechanism comprising a train of gears including clutch means connecting said source and said operating mechanism, paired trains of gears each including clutch means, each train of said pair being connected to a different lateral unit of said running gear, and gear means including paired clutch means for selectively connecting for driving in opposite directions said paired trains of gears to said first mentioned train of gears between said power source and the clutch means included in said first mentioned train of gears.

6. In a mobile material handling machine, running gear comprising laterally disposed driven wheels and at least one caster wheel, a material lifting device, a power source, and a transmission mechanism comprising a train of gears including clutch means connecting said power source and said material lifting device, paired trains of gears each including clutch means, each train of said pair being connected to a different driven wheel, and gear means including paired clutch means for selectively connecting for driving in opposite directions said paired trains of gears to said first mentioned train of gears between said power source and the clutch included in said first mentioned train of gears.

7. In a mobile material handling machine including laterally disposed running gear, a material lifting device and a power source, a transmission mechanism comprising a train of gears including clutch means connecting said power source and said material lifting device, and paired trains of gears each including clutch means, each train of said pair being connected to a different lateral unit of said running gear, and to said first train of gears between said power source and said first clutch.

8. In a mobile material handling machine including laterally disposed running gear, a material lifting device and a power source, a transmission mechanism comprising a train of gears including a manually engageable clutch connecting said power source and said material lifting device, paired trains of gears each including a spring-engaged manually disengageable clutch, each train of said pair being connected to a different lateral unit of said running gear, gear means including paired manually engageable clutches for selectively connecting for driving in opposite directions said paired trains of gears to said first mentioned train of gears between said power source and the clutch included in said first mentioned train of gears, and a single manually operable control member for selectively engaging either of said paired manually engageable clutches and for selectively disengaging either of said spring-engaged clutches.

9. In a mobile material handling machine including laterally disposed running gear, a material lifting device and a power source, a transmission mechanism comprising a train of gears including a clutch connecting said power source and said material lifting device, paired trains of gears each including an independently engageable clutch, each train of said pair being connected to a different lateral unit of said running gear, gear means including paired alternately engageable clutches for selectively connecting for driving in opposite directions said paired trains of gears to said first mentioned train of gears between said power source and the clutch included in said first mentioned train of gears, a single manually operable control member pivotally mounted for universal movement, means for converting movements of said control member into two sets of movements in mutually perpendicular planes, means for selectively engaging either of said paired alternately engageable clutches in response to movement in one of said planes, and means for selectively controlling engagement and disengagement of said independently engageable clutches in response to movement in the other of said planes.

10. In a mobile material handling machine including laterally disposed running gear, a power source, and transmission means connecting said power source and said running gear for driving each lateral unit of said running gear in both forward and reverse directions, a single manually operable control member pivotally mounted for universal movement, means for converting movements of said control member into two sets of movements in mutually perpendicular planes, means for selectively actuating said transmission means to drive said running gear in forward or reverse direction in response to movement in one of said planes, and means for selectively actuating said transmission means to drive either of the lateral units of said running gear in response to movement in the other of said planes.

11. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, gear means including paired clutch means for selectively connecting for driving in opposite directions said paired trains of gears to said first mentioned train of gears between said power source and the clutch means included in said first mentioned train of gears, laterally paired braking means adapted to brake said running gear, and means for selectively actuating said braking means.

12. In a mobile material handling machine including laterally disposed running gear, a material lifting device and a power source, a transmission mechanism comprising a train of gears including clutch means connecting said power source and said material lifting device, paired trains of gears each including clutch means, each train of said pair being connected to a different lateral unit of said running gear, gear means including paired clutch means for selectively connecting for driving in opposite directions said paired trains of gears to said first mentioned train of gears between said power source and the clutch means included in said first mentioned train of gears, laterally paired braking means adapted to brake said running gear, a control member pivotally mounted for movement in two mutually perpendicular planes, means for engaging both of said paired braking means in response to movement of said member in one of said planes, and means for selectively engaging either of said paired braking means in response to movement of said member in the other of said planes.

13. A mobile material handling machine comprising in combination laterally disposed running gear, a frame carried by said running gear, a material lifting bucket and operating mechanism therefor carried by said frame, a power source on said frame, and transmission mechanism comprising a train of gears including clutch means connecting said power source and said operating mechanism, paired trains of gears each including clutch means, each train of said pair being connected to a different lateral unit of said running gear, and gear means including paired clutch means for selectively connecting for driving in opposite directions said paired trains of gears to said first mentioned train of gears between said power source and the clutch means included in said first mentioned train of gears.

14. A mobile material handling machine comprising in combination laterally disposed running gear, a frame carried by said running gear, a material lifting bucket and operating mechanism therefor carried by said frame, a power source on said frame and transmission mechanism comprising a train of gears including clutch connecting said power source and said operating mechanism, paired trains of gears each including an independently engageable clutch, each train of said pair being connected to a different lateral unit of said running gear, and gear means including paired alternately engageable clutches for selectively connecting for driving in opposite directions said paired trains of gears to said first mentioned train of gears between said power source and the clutch included in said first mentioned train of gears, said frame including an integral member supporting and totally enclosing all of the gear members of said transmission mechanism in cooperation with a single removable closure member.

15. A mobile material handling machine comprising in combination laterally disposed running gear, a frame carried by said running gear, a material container carried by said frame, a material lifting bucket and operating mechanism therefor carried by said frame and adapted to lift said bucket from filling position to dumping position with respect to said container, means for braking said operating mechanism, a power source on said frame, and transmission mechanism comprising a train of gears including a clutch connecting said power source and said operating mechanism, paired trains of gears each including an independently engageable clutch, each train of said pair being connected to a different lateral unit of said running gear, gear means including paired alternately engageable clutches for selectively connecting for driving in opposite directions said paired trains of gears to said first mentioned train of gears between said power source and the clutch included in said first mentioned train of gears, laterally paired braking means adapted to brake said running gear, a single manually operable control member for actuating said first named clutch and said means for braking said operating mechanism, a single manually operable control member for selectively engaging either of said paired alternately engageable clutches and for selectively controlling engagement and disengagement of said independently engageable clutches, a control member pivotally mounted for movement in two mutually perpendicular planes, means for engaging both of said paired braking means in response to movement of said last named control member in one of said planes, and means for selectively engaging either of said paired braking means in response to movement of said last named control member in the other of said planes.

16. A mobile material handling machine comprising in combination laterally disposed running gear, a frame carried by said running gear, a material container carried by said frame, a material lifting bucket and operating mechanism therefor carried by said frame and adapted to lift said bucket from filling position to dumping position with respect to said container, means for braking said operating mechanism, a power source on said frame, and transmission mechanism comprising a train of gears including a clutch connecting said power source and said operating mechanism, paired trains of gears each including an independently engageable clutch, each train of said pair being connected to a different lateral unit of said running gear, gear means including paired alternately engageable clutches for selectively connecting for driving in opposite directions said paired trains of gears to said first mentioned train of gears between said power source and the clutch included in said first mentioned train of gears, laterally paired braking means adapted to brake said running gear, an operator's platform carried by said frame, a single manually operable control member for actuating said first named clutch and said means for braking said operating mechanism, a single manually operable control member for selectively engaging either of said paired alternately engageable clutches and for selectively controlling engagement and disengagement of said independently engageable clutches, a control member pivotally mounted for movement in two mutually perpendicular planes, means for engaging both of said paired braking means in response to movement of said last named control member in one of said planes, and means for selectively engaging either of said paired braking means in response to movement of said last named control member in the other of said planes, the two first named control members being mounted on said machine adjacent said operator's platform and positioned for actuation one by each hand of an operator and the last named of said control members being mounted on said machine adjacent said operator's platform and positioned for actuation by a foot of such operator.

17. In a mobile material handling machine including laterally disposed running gear and a power source, a power shaft disposed longitudinally between said running gear, a transverse shaft, paired sleeves mounted for rotation about said transverse shaft, gear means connecting said sleeves with said power shaft for rotation of said sleeves each in an opposite sense, alternately engageable clutch means for selectively connecting either of said sleeves with said transverse shaft and paired trains of gears each including a clutch, each train of said pair connecting a different lateral unit of said running gear to said transverse shaft.

18. In a mobile material handling machine including laterally disposed running gear and a power source, a power shaft disposed longitudinally between said running gear, a transverse shaft, paired sleeves mounted for rotation about said transverse shaft, gear means connecting said sleeves with said power shaft for rotation of said sleeves each in an opposite sense, alternately engageable clutch means disposed at the outer ends of said sleeves and said transverse shaft for selectively connecting either of said sleeves with said transverse shaft, a second transverse shaft, gear means connecting said first transverse shaft with said second transverse shaft; paired sleeves mounted for rotation about said second transverse shaft, independently operable clutch means disposed at the outer ends of said second transverse shaft and of the last-named sleeves, and paired trains of gears connecting each of said last-named sleeves to a different lateral unit of said running gear.

19. In a mobile material handling machine, running gear comprising laterally disposed driven wheels and at least one caster wheel, a power source, a power shaft disposed longitudinally of the machine, a transverse shaft, paired sleeves mounted for rotation about said transverse shaft, gear means connecting said sleeves with said power shaft for rotation of said sleeves each in an opposite sense, alternately engageable clutch means for selectively connecting either of said sleeves with said transverse shaft, and paired trains of gears each including a clutch, each train of said pair connecting a different driven wheel of said running gear to said transverse shaft.

20. In a mobile material handling machine, laterally disposed running gear, a power source, and transmission means connecting said power source with said running gear and comprising paired trains of gears each including a clutch, each train of said pair being connected to a different lateral unit of said running gear, and gear means including paired clutches for selectively connecting for driving in opposite directions said paired trains of gears to said power source.

21. In a mobile material handling machine, laterally disposed running gear, a power source, and transmission means connecting said power source with said running gear and comprising paired trains of gears each including a clutch, each train of said pair being connected to a different lateral unit of said running gear, gear means including paired clutches for selectively connecting for driving in opposite directions said paired trains of gears to said power source, paired braking means mounted in braking relation to said running gear, and means for selectively actuating said braking means.

22. In a mobile material handling machine, running gear comprising laterally disposed driven wheels supporting one end of the machine and free swiveling caster wheel means supporting the other end of said machine, a power source, and transmission means connecting said power source with said driven wheels and comprising paired trains of gears each including a clutch, each train of said pair being connected to a different driven wheel, and gear means including paired clutches for selectively connecting for driving in opposite directions said paired trains of gears to said power source.

23. In a mobile material handling machine, running gear comprising laterally disposed driven wheels supporting one end of the machine and free swiveling caster wheel means supporting the other end of said machine, a power source, and transmission means connecting said power source with said driven wheels and comprising paired trains of gears each including a clutch, each train of said pair being connected to a different driven wheel, gear means including paired clutches for selectively connecting for driving in opposite directions said paired trains of gears to said power source, paired braking means mounted in braking relation to said driven wheels, and means for selectively actuating said braking means.

24. In a mobile material handling machine including laterally disposed running gear and a power source, a power shaft disposed longitudinally between said running gear, a transverse shaft, paired sleeves mounted for rotation about said transverse shaft, gear means connecting said sleeves with said power shaft for rotation of said sleeves each in an opposite sense, clutch means disposed at the outer ends of said sleeves and said transverse shaft for selectively connecting either of said sleeves with said transverse shaft, a second transverse shaft, gear means connecting said first transverse shaft with said second transverse shaft, paired sleeves mounted for rotation about said second transverse shaft, independently operable clutch means disposed at the outer ends of said second transverse shaft and of the last-named sleeves, paired trains of gears connecting each of said last-named sleeves to a different lateral unit of said running gear, and casing members including all of said gear members within a single compartment excluding all of said clutch members.

25. In a mobile material handling machine including laterally disposed running gear and a power source, a power shaft disposed longitudinally between said running gear, a transverse shaft, paired sleeves mounted for rotation about said transverse shaft, gear means connecting said sleeves with said power shaft for rotation of said sleeves each in an opposite sense, alternately engageable clutch means disposed at the outer ends of said sleeves and said transverse shaft for selectively connecting either of said sleeves with said transverse shaft, a second transverse shaft, gear means connecting said first transverse shaft with said second transverse shaft, paired sleeves mounted for rotation about said second transverse shaft, independently operable clutch means disposed at the outer ends of said second transverse shaft and of the last-named sleeves, paired trains of gears connecting each of said last-named sleeves to a different lateral unit of said running gear, paired braking means mounted in braking relation to the driven members of last-named clutch means, and means for selectively actuating said braking means.

26. In a mobile material handling machine including laterally disposed running gear, a material lifting device and a power source, a transmission mechanism comprising a train of gears including a clutch connecting said power source and said material lifting device, paired trains of gears each including an independently engageable clutch, each train of said pair being connected to a different lateral unit of said running gear, gear means including paired alternately engageable clutches for selectively connecting for driving in opposite directions said paired trains of gears to said first mentioned train of gears between said power source and the clutch included in said first mentioned train of gears, and a single manually operable control member for selectively engaging either of said paired alternately engageable clutches and for selectively controlling engagement and disengagement of said independently engageable clutches.

27. In a mobile material handling machine including laterally disposed running gear, a power source, and transmission means connecting said power source and said running gear for driving each lateral unit of said running gear in both forward and reverse directions including a clutch in the drive to each lateral unit, a single manually operable control member pivotally mounted for universal movement, means responsive to components of movement of said control member in one plane for selectively actuating said transmission means to drive said running gear in forward or reverse direction and means responsive to components of movement of said control member in a plane perpendicular to said first plane for selectively actuating said clutches in the transmission means to drive either of the lateral units of said running gear.

28. In a mobile material handling machine including laterally disposed running gear, a power source, and transmission means connecting said power source and said running gear for driving each lateral unit of said running gear in both forward and reverse directions including a clutch in the drive to each lateral unit, a single manually operable control member pivotally mounted for universal movement, means responsive to components of movement of said control member about two mutually perpendicular axes for selectively actuating said transmission means for forward and reverse drive of said running gear in response to movement of said control member about one of said axes and for selectively actuating said clutches in the transmission means to drive either of the lateral units of said running gear in response to movement of said control member about the other of said axes.

EDWIN B. ROYLE.

REFERENCES CITED

The following references are of record in the file of this patent:

UNITED STATES PATENTS

| Number | Name | Date |
|---|---|---|
| 1,184,705 | Norelius | May 23, 1916 |
| 1,356,678 | Wickersham | Oct. 26, 1920 |
| 1,360,078 | Berry | Nov. 23, 1920 |
| 1,520,432 | Norelius | Dec. 23, 1924 |
| 1,640,621 | Smith | Aug. 30, 1927 |
| 1,868,827 | Guy | July 26, 1932 |
| 2,169,440 | Weiss | Aug. 15, 1939 |
| 2,254,192 | White | Aug. 26, 1941 |
| 2,301,832 | Towson | Nov. 10, 1942 |
| 2,329,372 | Hitch | Sept. 14, 1943 |

FOREIGN PATENTS

| Number | Country | Date |
|---|---|---|
| 414,350 | Germany | May 28, 1925 |